United States Patent

Kamoshida

[15] 3,670,404

[45] June 20, 1972

[54] METHOD OF FABRICATING A SEMICONDUCTOR

[72] Inventor: Mototaka Kamoshida, Tokyo, Japan

[73] Assignee: Nippon Electric Company, Limited, Tokyo, Japan

[22] Filed: June 6, 1969

[21] Appl. No.: 831,041

[30] Foreign Application Priority Data

June 10, 1968 Japan....................................43/40071

[52] U.S. Cl.....................................29/574, 29/578, 29/580, 250/83.3 H, 356/51

[51] Int. Cl...........................................B01j 17/00, H011 7/00

[58] Field of Search....................29/574, 578, 580, 587, 589; 356/51, 172; 250/83.3 H

[56] References Cited

UNITED STATES PATENTS 3,447,235 6/1969 Rosvold et al. ..........................29/578

OTHER PUBLICATIONS

IBM Technical Disclosure Bulletin, Two Sided Masking of Silicon Wafers, S. A. Steiner, Vol. 9 No. 10 Mar. 1967 pp. 1385–1386.

*Primary Examiner*—John F. Campbell
*Assistant Examiner*—W. Tupman
*Attorney*—Sandoe, Hopgood and Calimafde

[57] ABSTRACT

Individual small semiconductor elements are fabricated and the front and back surfaces of the elements aligned by utilizing the difference in penetration of infrared rays as viewed from the other side of the elements by an infrared optic system. The difference is afforded by providing the reverse side of the semiconductor element with an irregularity in the thickness of either an insulating film, a photoresist film, the density of a doped impurity, or irregularities in the underside surface of the semiconductor element itself.

6 Claims, 14 Drawing Figures

INVENTOR
Mototaka Kamoshida
by
Sandoe, Hopgood & Calimafde
ATTORNEYS.

PATENTED JUN 20 1972 3,670,404

*INVENTOR*
Mototaka Kamoshida by
Sandoe, Hopgood & Calimafde
ATTORNEYS.

METHOD OF FABRICATING A SEMICONDUCTOR

BACKGROUND OF THE INVENTION

This invention relates generally to a method of fabricating a semiconductor and, more particularly, to a semiconductor having metal or metal wiring on the back thereof before it is separated into discrete semiconductor pieces and the process for fabricating the same. The term "metal wiring" as used herein means an expanded contact and shall include a beam lead extending externally from the semiconductor pellet.

Heretofore, the forming of metal wiring on the back of a semiconductor piece has been extremely difficult due to the difficulty in achieving alignment of the front and back faces. Conventionally, there exists only a method for fabricating the electrodes in such a manner that metal is deposited or plated all over the back of the semiconductor wafer without the alignment of the front and back thereof. Further, even this method is limited to only relatively larger pellets of semiconductor, and in the case of relatively smaller pellets it requires the step of forming a thin wafer of semiconductor wafer so as to be more easily divisible into pieces; without the metal being joined at this stage. This results in the necessity of the step of adhering a metal foil such as of gold-antimony of low melting point to the semiconductor pellets one by one after the large semiconductor wafer is separated into small pellets with the result that it is difficult to automate the present operation of fabricating the semiconductors.

On the other hand, "face bonding" (including a beam lead type) provides easy automation and high reliability. Inasmuch, however, as the face bonding technique does not cause close adherance of the semiconductor pellet to the metal container or metal base ribbon, it has the disadvantage of poor heat dissipation. In order to improve the efficiency of heat dissipation, it has been suggested either that metal of high heat conductivity be adhered to the back of the semiconductor pellet, or that some heat dissipating device such as heat dissipating plates be mounted, or a metal having a low melting point be previously formed on the back of the semiconductor pellet. However, when assembled in the beam lead type technique, the present art of separating the wafer into individual pellets still requires the step of making the thick wafer into a thin wafer before the pelletizing step, with the result that at present it is impossible to fabricate the beam lead elements by mass production where metal is adhered on the back. Furthermore, the face-down-bonding type technique wherein the semiconductor pellet is adhered to the substrate by means of a supersonic bonding process, requires a relatively thicker semiconductor pellet since some force is applied directly to the pellet itself. This results in the fact that in facedown-bonding even if the active region of the semiconductor is small, the area of the semiconductor pellet must be larger in order to fabricate the thicker semiconductor pellet.

It can be appreciated from the foregoing disadvantages of the conventional method of fabricating semiconductor devices that the front and back surfaces of the semiconductor pellet should be aligned so as to correspondingly dispose the semiconductor pellets. It follows that if these surfaces are correctly aligned not only may metal be adhered to the back of the semiconductor in the face bonding technique, but also, the leads of electrodes may be drawn from the back of the semiconductor with the result that one can expect not only preferable electric characteristics but good heat conductivity efficiency as well. In other words, it can be anticipated that wiring on both the front and back faces of the semiconductor piece can be achieved, and, if this is combined with the method of fabricating a beam lead element, wiring may be performed between the front and back of the semiconductor element. This method is particularly advantageous for the method of fabricating the so-called MIS semiconductor or metal insulator semiconductor having the structure of metal insulator and semiconductor which does not require, for example, if an epitaxial layer or the like. In addition, if the alignment of the front and back of the semiconductor wafer is performed in order to provide an easy manipulation and separation of an integral semiconductor material into individual semiconductor pieces, the part to be separated may be previously made thinner. Further, the so-called Wafer Matrix Transfer Technique described on pages 16 to 26 of the Western Electric Engineers issued on Dec. 1968, in the method of fabricating the beam lead element may be applied to the process for fabricating the general semiconductor element.

OBJECTS OF THE INVENTION

Therefore, it is an object of the present invention to provide a semiconductor element in which the front and back of the semiconductor wafer is aligned for the purpose of accomplishing the aforementioned ends.

It is another object of the present invention to provide a semiconductor of the face bond type having metal adhered to the individual pellets on the back while in the state of a single semiconductor pellets and before separation into individual semiconductor pellets.

It is still another object of the present invention to provide more facile manipulation of thicker semiconductor pellets without the necessity of making it into thinner pellets and yet providing the step of adhering metal on the back of the semiconductor pellet if required.

BRIEF SUMMARY OF THE INVENTION AND ITS FEATURES

In order to perform the aforementioned and other objects and purposes, the present invention is predicated upon an aligning exposure device including an infrared ray microscope. One aspect of the present invention comprises the steps of forming a pattern which has an angle other than normal to the plane of its edge portion (or which has an angled edge portion as viewed from its normal direction) and etching the pattern for aligning the front and back of the semiconductor wafer by seeing the contour formed by the edge portion of the pattern on an insulated coating from the other side via an infrared ray, and thereafter providing metal wiring by means of the conventional method, and, further, the steps of adhering metal onto part or all of the back of the semiconductor pellet, and polishing chemically the back of the semiconductor wafer on the portion to be separated by means of the aligning process so as to provide thicker pellets. If, as in the conventional process metal is adhered to the entire back surfaces of the semiconductor pellet without any polishing or any treating, the disposition of the front and back may not be aligned by utilizing the infrared ray resulting that the method of the present invention is necessary for performing the preferably aligned semiconductor wafer.

According to another aspect of the present invention, there is provided a method of fabricating a semiconductor device comprising the steps of selectively forming an irregularity in the thickness of an insulating film or photoresist film provided on one side of the semiconductor wafer or the wafer by forming irregularities on one side thereof, and aligning the disposition of the front and back of the semiconductor wafer by utilizing the difference of the refracting direction or penetrating amount of an infrared ray due to the irregular thickness by projecting the infrared ray through the semiconductor wafer.

According to a still further aspect of the present invention, there is provided a method for fabricating a semiconductor element which comprises the steps of forming a layer different in density of an impurity on a predetermined portion and aligning the disposition of the front and back of the semiconductor wafer by utilizing the fact that the irregularity of the impurity in the semiconductor wafer causes a different absorption coefficient of the infrared ray through the layer. Thereafter, a pattern may be etched on the insulated passivation film of the semiconductor wafer which pattern can be used for a visual sign.

According to still another feature of the present invention, there is provided a semiconductor device which is constructed by means of face bond type technique including beam lead type, and whose metallization patterns, including such beam leads as expand from the pellet, are on the entire or parts of both the front and back surfaces of the pellet, and whose metallization patterns are made by one metal layer or by superposing several metal layers. In another semiconductor pellet, a passivation film is provided on the back surface and a contact hole is formed therethrough.

In order to further clarify the principle of the present invention the background description will be further developed hereinafter. When an angle is provided on an edge portion of a substance of an optically transparent plate, due to the fact that some difference occurs between the refracting light passing therethrough and that penetrating the upper or lower surfaces, the contour constructed by the edge portion is clearly seen. The present invention utilizes this fact. It means that under the visual ray if the transparent glass is cut in a shape of a trapezoid in section at an edge portion the disposition of the edge portion may be seen from a direction normal to the surface of the glass plate. This principle is utilized for a semiconductor which is transparent to infrared rays or for a photoresponsive film having the same nature in the present invention.

The edge portion which is not formed in the inclination also might serve similarly as the edge portion formed with the inclination if the incident ray has an angle other than normal to the projecting surface. As a result, according to the present invention, the edge portion may be formed not only only in the taper but also in the vertical plane.

The present invention utilizes another principle such that the amount of the infrared ray energy which penetrates through the semiconductor wafer which is selectively removed on one side thereof is different in response to the difference of the thickness of the semiconductor wafer. This means that the alignment of the front and the back of the semiconductor can be operated by observing the difference of the penetrating ray intensity from one side by projecting the infrared ray from the other side to the semiconductor after one side of the surface of the semiconductor wafer has been previously etched selectively or provided with a photoresponsive film which is not readily penetrated by infrared rays.

The present invention further utilizes the principle that a layer doped with an impurity density different from the others and having a distinct absorption coefficient may be provided in the semiconductor wafer, so that the disposition of the front and back surfaces of the semiconductor can be aligned by means of the brightness of the penetrating ray to provide a reference mark or a desired pattern which serves as a reference mark on an insulator passivation film on the semiconductor wafer.

The above mentioned and other features and objects of this invention and the manner of attaining them will become more apparent and the invention itself will best be understood by reference to the following description of embodiments of the invention taken in conjunction with the accompanying drawings, the description of which follows.

FIGS. 1(*a*) through 1(*f*) are sectional views of the respective steps of a method of fabricating a semiconductor according to the present invention:

FIGS. 2 through 4 are sectional views of an alternate method of semiconductor fabrication according to the present invention; and FIGS. 5(*a*) through 5(*e*) are views in section similar to FIGS. 1(*a*) through 1(*f*) but showing still another embodiment of the present invention.

DETAILED DESCRIPTION OF THE INVENTION

Referring now to FIGS. 1(*a*) through 1(*f*) which show the steps of the method of fabricating a semiconductor beam lead element according to the present invention, a silicon wafer 11 is covered with an insulated passivation film 12, such as silicon dioxide, on both sides as shown in FIG. 1(*a*).

A photoresist film 13 such as material KMER or KTER (generally Kodak Metal Etch Resist or Kodak Thin film Etch Resist) normally used for photographic etching is formed to a depth of approximately 0.8 to 3 microns on the insulated passivation film 12 of the back of the silicon wafer 11 as illustrated in FIG. 1(*b*) (the back is the side first exposed to the rays). The wafer 11 is then exposed through a mask, developed and immersed in an etchant for the insulated protecting film 12 such as a mixture of hydrofluoric acid or ammonium fluoride and water so as to remove part of insulated film 12. In this case a mask (not shown) may be preferably used for separating the wafer into individual pellets. Part of the front of insulated passivation film 12 is selectively removed, as shown in FIG. 1(*c*), by means of conventional photographic etching by aligning the position of the front and back of the wafer 11 by utilizing an impinging infrared ray projected from the back of the wafer and seen from the front including the contour of the photoresist film 13 exposed and developed as aforesaid.

This step may be accommodated along with the step of providing a window for the later step of diffusing an impurity into the wafer 11.

As a result, the alignment of the positions of the front and back surfaces of the semiconductors sheet has been accomplished. Therefore, the use of the infrared ray is not necessary for the alignment of the back and front surfaces of the semiconductor wafer in the following steps of the fabricating process, and it is possible to merely align visually.

Figure 1A:
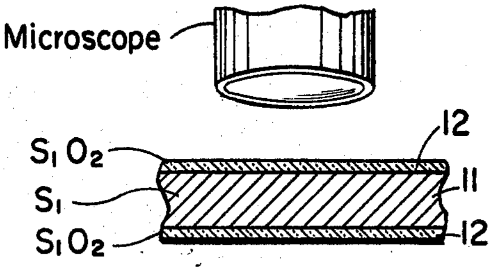
Figure 1B:
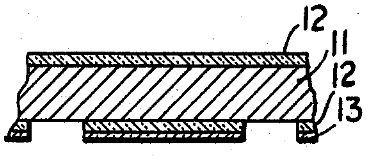
Figure 1C:
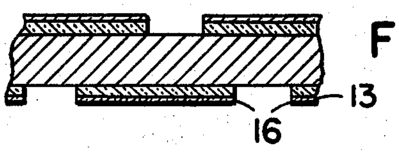
Figure 1D:
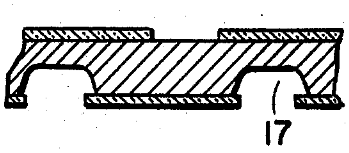
Figure 1E:
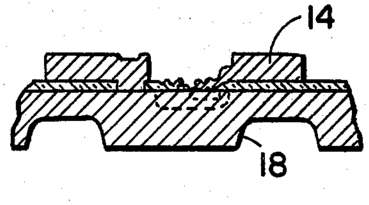
Figure 1F:
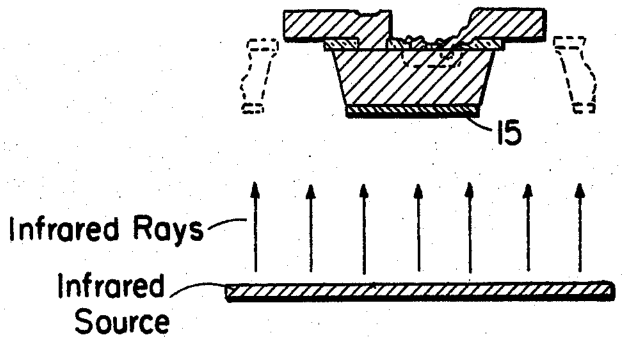

The structure as shown in FIG. 1(*d*) is formed from the structure as shown in FIG. 1(c) through the steps of removing the photoresist film 13 on the wafer 11, coating the front with wax or a photoresist film and selectively removing part of silicon element 11 with an etchant such as a mixture of hydrofluoric acid, nitric acid or acetate by using a mask of the insulated passivation film 13 which has been selectively removed in the previous step shown in FIGS. 1(*b*), and removing the wax or photoresist film or the like from the front of the wafer 11. The conventional steps such as fabricating the conventional beam lead element may be used in the following steps. If necessary, the procedure may include the additional steps of coating a silicon nitride film or the like on the wafer 11, and forming metal wiring 14 on the front of the wafer 11 as shown in FIG. 1(*e*) so as to complete the treatment of the front of the water 11.

In the conventional method of fabricating the semiconductor the insulated passivation film on the back of the wafer is removed in the step where the window for the collector is provided, but when there remains the insulated projecting film on the back of the wafer by applying other methods, it must be completely removed.

Thereafter a metal 15 is adhered on the back of the wafer 11 by means of depositing, spattering or plating, then the metal 15 is formed into the desired form by conventional photographic etching, thereafter the silicon is selectively removed to separate the integral silicon element into individual pellets. As a result, beam lead elements attached with metal on the back of the wafer 11 are obtained as shown in FIG. 1 (*f*).

The aforementioned step employs the assumption that the metal 15 is soluble in the etchant of silicon and yet the photoresist film 13 is also soluble in the same etchant in the step shown in FIG. 1 (*d*). This introduces the fact that the etching step shown in FIG. 1 (*d*) should be carefully used, considering the time of endurance of the photoresist film. If the photoresist film used in the step illustrated in FIG. 1 (*f*) is strong enough not to be completely soluble in the etching solution, or the metal 15 is not soluble in the etching solution for silicon, the selective etching in the step shown in FIG. 1 (*d*) may be operated until the step is formed on the silicon surface so that even through the insulated passivation film is removed the back may be aligned with the front of the wafer 11.

Although the aforementioned method has adopted the step of aligning the front and back of the silicon element 11 by seeing the edge 16 of the photoresist film 13, this aligning step may also be performed by using the tapered surface 18 of a portion 17 removed selectively from the silicon element 11.

If the thickness of the portion 17 selectively removed in the step illustrated in FIG. 1 (*d*) is sufficiently different from the other portion, the relative brightness due to the difference in the penetrating power of the infrared rays can be utilized.

The invention has been described above in connection with a beam lead transistor. This invention may also be applied in the method of fabricating an integrated circuit by changing some of the steps. When an opitaxial wafer having a layer doped with antimony is treated from the step shown in FIG. 1 (*b*) to the step illustrated in FIG. 1 (*c*), the steps of forming a window for the diffusion region on the front of the wafer and thereafter treating the back thereof may be accomplished. In the case of a wafer for use in an integrated circuit, an epitaxial wafer having a layer doped with a high density of impurity may normally be used. Since the layer doped with a high density of impurity is different from the rest of the wafer in the absorption coefficient for infrared rays the brightness of the penetrating infrared ray clarifies the position of the doped layer. The aligning of the front and back of the wafer may be performed by utilizing the aforementioned fact, and thereafter it may be etched so as to provide a pattern for sight.

Figure 2:
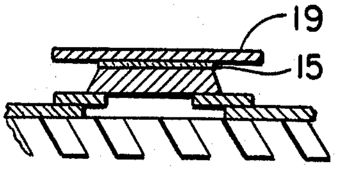

Thus, a beam lead element attached with the metal 15 on the back of the element as illustrated in FIG. 1 (*f*) may be accomplished. If metal 15 has a low melting point, it is easy to mount heat dissipating plates 19 on metal 15 as shown in FIG. 2.

This structure may provide easy contact with the upper cover of the container attached to the heat dissipating plates or heat dissipating material.

Figure 3:
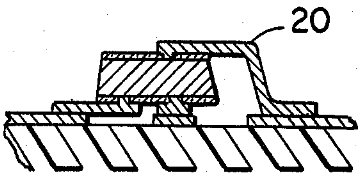

Through the same steps as in the first embodiment a beam lead 20 as shown in FIG. 3 may be drawn from the back of the element so as to form the semiconductor. It may also be possible to provide wiring on both the front and back of the element.

If this fact is used for providing a MIS integrated circuit element as previously described, it effects a high degree of integrity.

If the wafer having epitaxial layers on both sides is utilized, a semiconductor having semiconductor elements on both the front and back sides of the semiconductor may be achieved.

Figure 4:
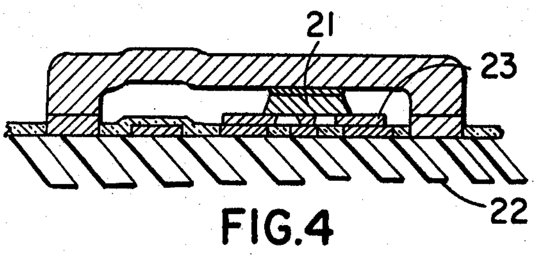
Figure 5A:
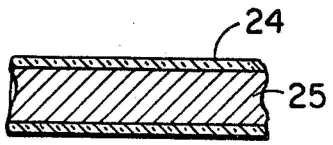
Figure 5B:
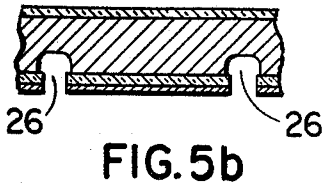
Figure 5C:
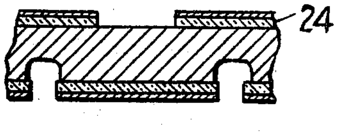
Figure 5D:
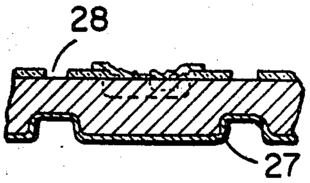
Figure 5E:
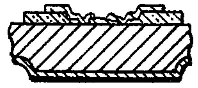

If metal is attached to the back of the semiconductor or a beam lead is also attached thereto, an element 21 may be connected with a semiconductor 22 having three dimensional wiring 23 as illustrated in FIG. 4.

Referring now to FIGS. 5 (*a*) through 5 (*e*), there is shown another embodiment of the method of fabricating a semiconductor according to the invention in which a planar element is illustrated. In this embodiment, a silicon wafer 25 is provided with insulated passivation films 24 on both sides as shown in FIG. 5 (*a*). The portion 26 to be separated on the back of the wafer 25 is selectively etched off by means of normal photographic etching process as seen in FIG. 5 (*b*). This etching may be performed to a thickness, which has been mechanically polished or chemically etched all over the back of the element so as to provide easy separation.

By projecting infrared rays onto one surface of the wafer, the pattern of the photoresist film used on the back of the wafer in the following steps or the pattern due to the difference of the penetrated infrared ray between the selectively removed portion of the wafer and the other portions can be seen. The first treatment of the front of the wafer 25 is performed by aligning the front and back of the water 25, so that the construction as shown in FIG. 5 (*c*) is formed.

Thereafter a predetermined metal 27 is adhered all over the back of the wafer by means of the conventional process as shown in FIG. 5 (*d*) wherein, if necessary, active metal may be used together with the metal 27 in order to closely contact the wafer 25. Thereafter a crack is formed at the portion 28 of the wafer 25 by a diamond stylus in a conventional manner, and the integral wafer is separated into individual pellets as seen in FIG. 5 (*e*).

If the sheet is treated as from the step down in FIG. 5 (*c*) directly into the step shown in FIG. 5 (*e*), though the metal 27 is not attached on the back of the wafer, a thicker semiconductor than the conventional one (depending upon how polished or how much is removed in the step shown in FIG. 5 (*b*) ) is achieved.

It is one advantage of the present invention that since the separating step may be the last one performed the characteristic of the individual pieces may be maintained while they are automatically handled and processed from the front side. It further means that the steps of cleaning the individual semiconductor pellets and adhering them to the container may be automated in continuation with the conventional automatic step of separating the semiconductor wafer into the individual pellets.

I claim:

1. A method of fabricating a semiconductor device comprising the steps of selectively etching a first pattern on one side of a semiconductor wafer in the form of a plurality of reduced thickness portions for enabling the ready separation of said wafer at said reduced thickness portions, positioning a mask containing a second pattern at the other side of said wafer, impinging infrared energy on said device from said one side; and aligning said mask and said first pattern with one another by utilizing the difference in the relative penetration of infrared rays due to the different thicknesses of said wafer as viewed from the other side of said semiconductor wafer.

2. A method of fabricating a semiconductor comprising the steps of providing a semiconductor wafer having insulated passivation films on both sides thereof, selectively etching a pattern at the portions of said wafer to be separated into a plurality of pellets on the back side of said wafer by means of a photographic etching process positioning a mask at the front side of said wafer, projecting infrared rays onto a photoresist film on the back side of said wafer and said pattern and observing the difference of the penetrating infrared rays between the selectively removed portions of the wafer and the other portions of said wafer so that alignment of said mask and said pattern selectively formed on the back side of the said wafer is achieved;

adhering a predetermined metal over the back side of the wafer;

making a crack at the portions on said wafer corresponding to the outer periphery of each of the pellets to be separated, and separating the integral wafer into individual pellets.

3. A method as set forth in claim 2, wherein said semiconductor is of silicon.

4. A method as set forth in claim 2, wherein said selectively etching steps for the portion to be separated is performed in such a degree that its thickness provides easy separation.

5. The method of claim 1, further comprising the steps of adhering a metal coating on said one side of said semiconductor wafer, and thereafter separating said wafer into a plurality of individual pellets along said reduced thickness portions.

6. A method of fabricating a semiconductor device comprising the steps of: providing a semiconductor wafer having cleaned major surfaces, selectively etching a pattern of reduced thickness portions on one of said major surfaces by means of a photographic etching process, said reduced thickness portions enabling the wafer to be separated into a plurality of pellets projecting infrared rays onto said one of said major surfaces and said pattern, and positioning a mask on the other of said major surfaces in registration with said pattern by way of observing the difference of the penetrating infrared rays between said portions and those portions of said wafer which have not been subjected to the selective etching.

* * * * *

75